United States Patent
Margetts et al.

(10) Patent No.: US 7,693,210 B2
(45) Date of Patent: Apr. 6, 2010

(54) HYBRID RAKE/EQUALIZER RECEIVER FOR SPREAD SPECTRUM SYSTEMS

(75) Inventors: Adam Robert Margetts, Columbus, OH (US); Alton Shelbourne Keel, Melbourne, FL (US)

(73) Assignee: Thomson Licensing, Boulogne-Billancourt (FR)

( * ) Notice: Subject to any disclaimer, the term of this patent is extended or adjusted under 35 U.S.C. 154(b) by 683 days.

(21) Appl. No.: 10/590,577

(22) PCT Filed: Mar. 9, 2004

(86) PCT No.: PCT/US2004/007676

§ 371 (c)(1),
(2), (4) Date: Aug. 22, 2006

(87) PCT Pub. No.: WO2005/099117

PCT Pub. Date: Oct. 20, 2005

(65) Prior Publication Data

US 2007/0165707 A1    Jul. 19, 2007

(51) Int. Cl.
H04B 1/00    (2006.01)
(52) U.S. Cl. .................. 375/150; 375/232; 375/142; 375/343; 375/349; 708/422; 708/813
(58) Field of Classification Search .............. 375/136, 375/137, 142, 150, 149, 152, 232, 343, 349; 708/422, 813, 323; 370/320, 333, 342, 441; 342/189, 378
See application file for complete search history.

(56) References Cited

U.S. PATENT DOCUMENTS

| 6,714,585 | B1 * | 3/2004 | Wang et al. ................. 375/148 |
| 2002/0181554 | A1 | 12/2002 | Kim et al. |
| 2003/0133424 | A1 * | 7/2003 | Liang et al. ................. 370/335 |
| 2003/0179812 | A1 | 9/2003 | Carbone et al. |

FOREIGN PATENT DOCUMENTS

| EP | 1 126 627 A2 | 8/2001 |
| WO | WO 01/01595 A1 | 1/2001 |

OTHER PUBLICATIONS

Search Report Oct. 12, 2004.

* cited by examiner

Primary Examiner—David C Payne
Assistant Examiner—Rahel Guarino
(74) Attorney, Agent, or Firm—Robert D. Shedd; Robert B. Levy

(57) ABSTRACT

There is provided a hybrid rake/equalizer receiver for correlating a delay spread in a spread spectrum system. The hybrid rake/equalizer receiver includes a plurality of adaptive equalizers, each for filtering different regions of the delay spread that have an energy level above a pre-specified threshold to respectively provide equalized-descrambled chip sequences for correlation. Equalizer coefficients respectively corresponding to the plurality of adaptive equalizers are updated individually.

8 Claims, 4 Drawing Sheets

HYBRID RAKE/EQUALIZER RECEIVER FOR SPREAD SPECTRUM SYSTEMS

This application claims the benefit, under 35 U.S.C. §365 of International Application PCT/US2004/007676, filed Mar. 9, 2004, which was published in accordance with PCT Article 21(2) on Oct. 20, 2005 in English.

BACKGROUND OF THE INVENTION

1. Field of the Invention

The present invention generally relates to spread spectrum systems and, more particularly, to a hybrid rake/equalizer receiver for a spread spectrum system.

2. Background of the Invention

In wireless communications systems, signals propagate over many paths from the transmitter to the receiver. Delay diversity occurs in radio systems when the difference in signal arrival time between the shortest path and longest path exceeds the symbol duration. Delay diversity leads to inter-symbol interference (ISI) in classical communications systems, which degrades performance. Spread spectrum systems take advantage of delay diversity by learning the channel, then despreading and combining the energy from resolvable paths. Codes are designed to minimize the effect of inter-chip interference (ICI) caused by delay diversity. However, when multiple downlink data streams are multiplexed and transmitted via orthogonal codes, delay diversity destroys orthogonality, creating severe multi-access interference (MAI). The channel is time varying, which requires an adaptive learning process. Often, the delay spread in spread spectrum systems is very long compared to the chip duration, e.g., up to 100 chips. Furthermore, the delay spread is sparse, i.e., few energy regions, separated by nulls, characterize the delay spread.

Typical mobile units in Code Division Multiple Access (CDMA) systems employ a rake receiver, i.e., a channel matched filter, to take advantage of sparse delay diversity. A reduced complexity rake receiver combines energy from a few strongest paths, without regard to reducing MAI. Recently, a chip-level equalizer has been proposed to restore orthogonality, thereby reducing MAI in the bit estimates. Unfortunately, adaptively equalizing the entire channel delay spread with a single finite impulse response (FIR) equalizer requires complexity greater than the resources of current mobile units.

Accordingly, it would be desirable and highly advantageous to have a hybrid rake/equalizer receiver for a spread spectrum system that overcomes the above-described problems of the prior art.

SUMMARY OF THE INVENTION

The problems stated above, as well as other related problems of the prior art, are solved by the present invention, a hybrid rake/equalizer receiver for a spread spectrum system.

According to an aspect of the present invention, there is provided a hybrid rake/equalizer receiver for correlating a delay spread in a spread spectrum system. The hybrid rake/equalizer receiver includes a plurality of adaptive equalizers, each for filtering different regions of the delay spread that have an energy level above a pre-specified threshold to respectively provide equalized-descrambled chip sequences for correlation. Equalizer coefficients respectively corresponding to the plurality of adaptive equalizers are updated individually.

According to another aspect of the present invention, in a spread spectrum receiver, there is provided a method for correlating a delay spread. The method includes the step of respectively allocating each of a plurality of adaptive equalizers to different regions in the delay spread that exceed a pre-specified threshold energy level to filter the different regions so as to provide equalized-descrambled chip sequences there from. The method further includes the step of individually updating equalizer coefficients respectively corresponding to the plurality of adaptive equalizers.

These and other aspects, features and advantages of the present invention will become apparent from the following detailed description of preferred embodiments, which is to be read in connection with the accompanying drawings.

DETAILED DESCRIPTION OF THE INVENTION

The present invention is directed to a hybrid rake/equalizer receiver for enhancing rake receiver performance in spread spectrum receivers. Advantageously, the present invention applies an adaptive equalizer to each finger of a rake receiver to create the hybrid rake/equalizer receiver. Thus, the delay spread would be partially equalized in the region surrounding the rake finger. A few short equalizers may be employed (one for each finger of the rake) instead of one very long equalizer with many taps. It is to be appreciated that while the present invention is described herein with respect to Wideband Code Division Multiple Access (WCDMA) receivers for illustrative purposes, the present invention may be employed with any type of spread spectrum receiver. That is, given the teachings of the present invention provided herein, the hybrid rake/equalizer of the present invention may be utilized with respect to spread spectrum receivers other than WCDMA receivers, while maintaining the spirit and scope of the present invention.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
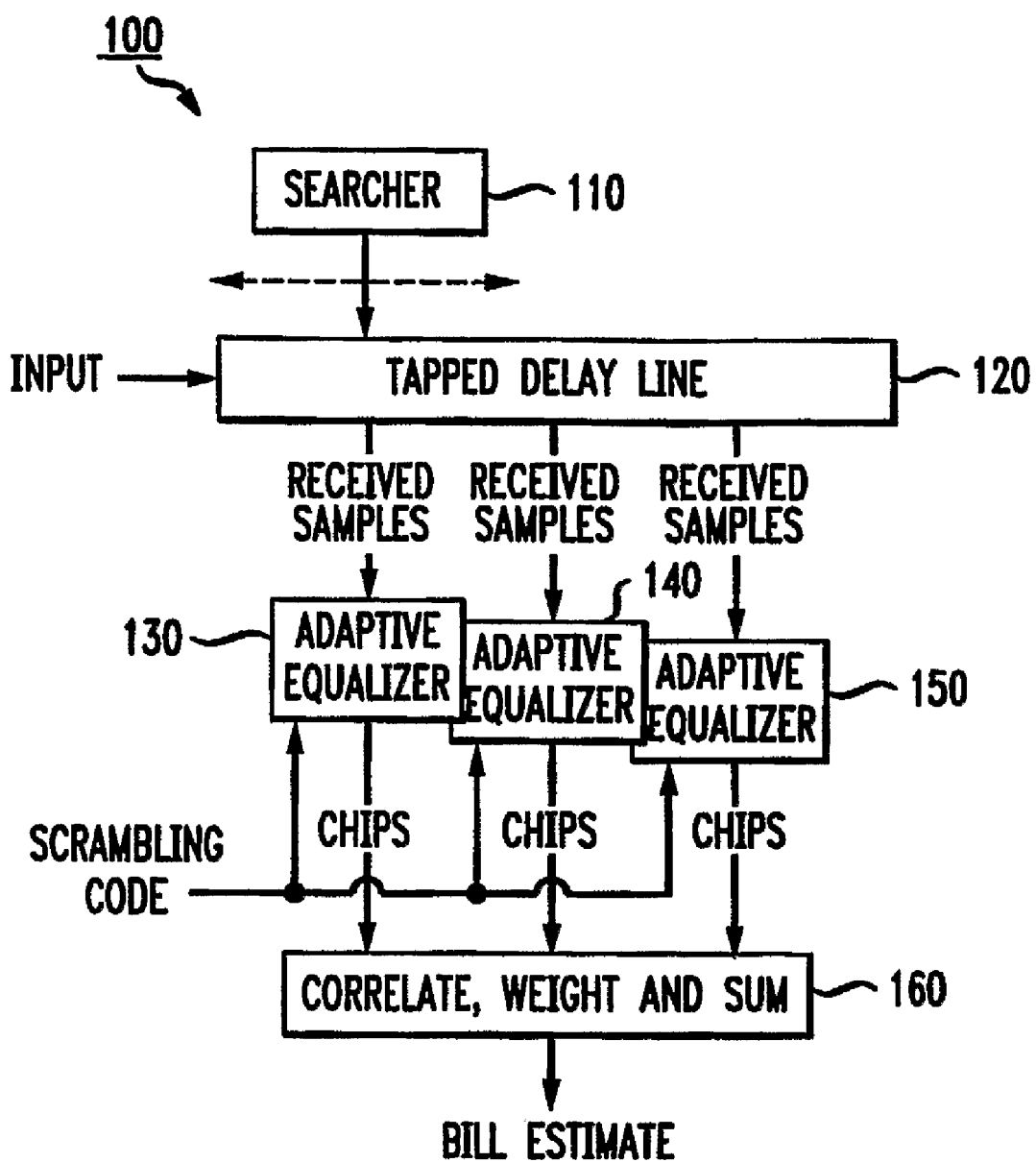
FIG. 1 is a diagram illustrating a rake/equalizer receiver 100 for a Wideband Code Division Multiple Access (WCDMA) system, according to an illustrative embodiment of the present invention.

FIG. 1 is a diagram illustrating a rake/equalizer receiver 100 for a Wideband Code Division Multiple Access (WCDMA) system, according to an illustrative embodiment of the present invention. The rake/equalizer receiver 100 includes a searcher module 110, a tapped delay line 120, a first adaptive equalizer 130, a second adaptive equalizer 140, a third adaptive equalizer 150, and a correlate, weight and sum module (hereinafter also interchangeably referred to as "correlation module") 160.

The searcher module 110 correlates to the pilot signal over different delays (taps) to find regions of high energy in the delay spread. As used herein, the phrase "delay spread" refers to the multiple signals that are received by a WCDMA receiver at different times due to multipath.

When a region of high energy is found in the delay spread, a finger is allocated and input samples are tapped from the tapped delay line 120. The adaptive equalizers 130, 140, and 150 filter the sample stream. Typically, the adaptive equalizers 130, 140, and 150 derive their error signals from the continuously transmitted pilot signals, such derivation requiring knowledge of the scrambling code. The equalized-descrambled chips (outputs of the adaptive equalizers 130, 140, and 150) are sent to the correlate, weight and sum module 160, which correlates to the short spreading code of the desired bit-stream. The correlation outputs are weighted according to how much energy was in the delay spread of their respective regions, thus regions of low energy are given a lower weight. The receiver may also employ trivial weighting (i.e., multiply by one). The weighted correlation outputs are summed by the correlate, weight and sum module 160 to produce a bit estimate.

For the sake of brevity, an exact implementation of the adaptive equalizers is not provided herein. However, for further detail, in the area of chip-rate adaptive equalization, see, for example, P. Schniter and A. R. Margetts, "Adaptive Chip-Rate Equalization of Downlink Multirate Wideband CDMA", *Proc. Asilomar Conf. on Signals, Systems, and Computers*, (Pacific Grove, Calif.), November 2002, which is incorporated by reference herein.

Figure 2:
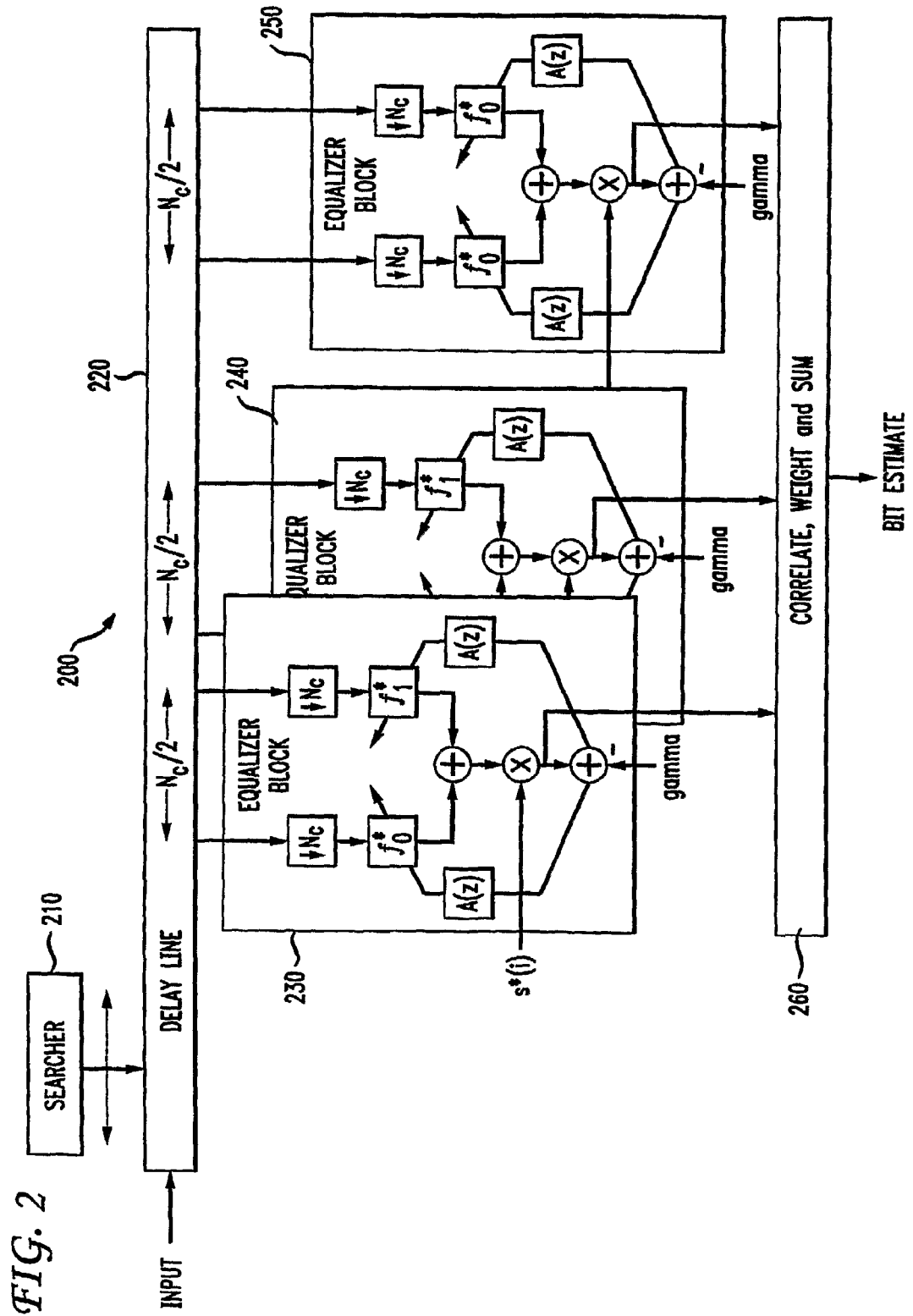
FIG. 2 is a diagram illustrating a fractionally spaced rake/equalizer receiver 200 for a Wideband Code Division Multiple Access (WCDMA) system, according to another illustrative embodiment of the present invention.

FIG. 2 is a diagram illustrating a fractionally spaced rake/equalizer receiver 200 for a Wideband Code Division Multiple Access (WCDMA) system, according to another illustrative embodiment of the present invention.

The rake/equalizer receiver 200 includes a searcher module 210, a tapped delay line 220, a first adaptive equalizer 230, a second adaptive equalizer 240, a third adaptive equalizer 250, and a correlate, weight and sum module (hereinafter also interchangeably referred to as "correlation module") 260.

$N_c$ is the number of samples per chip, $f_0^*$ and $f_1^*$ are the adaptive equalizer taps, $A(z)$ is an error filter (averager), gamma is a reference corresponding to the pilot bit, and $s(i)$ is the scrambling code. Each of the adaptive filters 230, 240, and 250 also include a first adder 299, a second adder 298, and a multiplier 297. Updates to the equalizer coefficients occur at the chip rate.

The chip-rate equalizer update algorithm for each adaptive equalizer is as follows:

$$a(i) = (1-\rho)r(i)s^*(i) + \rho a(i-1)$$

$$\bar{e}(i) = (1-\rho)(y(i)-\gamma) + \rho\bar{e}(i-1)$$

$$f(i-1) = f(i) - \mu a(i)\bar{e}^*(i)$$

$a(i)$ is an error filter averager
$\bar{e}(i)$ is the error output
$r(i)$ is a vector of received samples from the tapped delay line.
$s(i)$ is the scrambling sequence.
$y(i)$ is the fractionally spaced equalizer output.
$f(i)$ is the adaptive equalizer.
$\mu$ is the equalizer step-size
$\rho$ is the averaging-filter pole.
$\gamma$ is the desired bias.

These parameters and variables are defined, for example, in the above reference entitled "Adaptive Chip-Rate Equalization of Downlink Multirate Wideband CDMA". It is to be appreciated that the present invention is not limited to any particular adaptive equalizer algorithm including the aforementioned algorithm and, thus, any adaptive equalizer algorithm can be employed including, for the Recursive Least-Squares algorithm.

Figure 3:
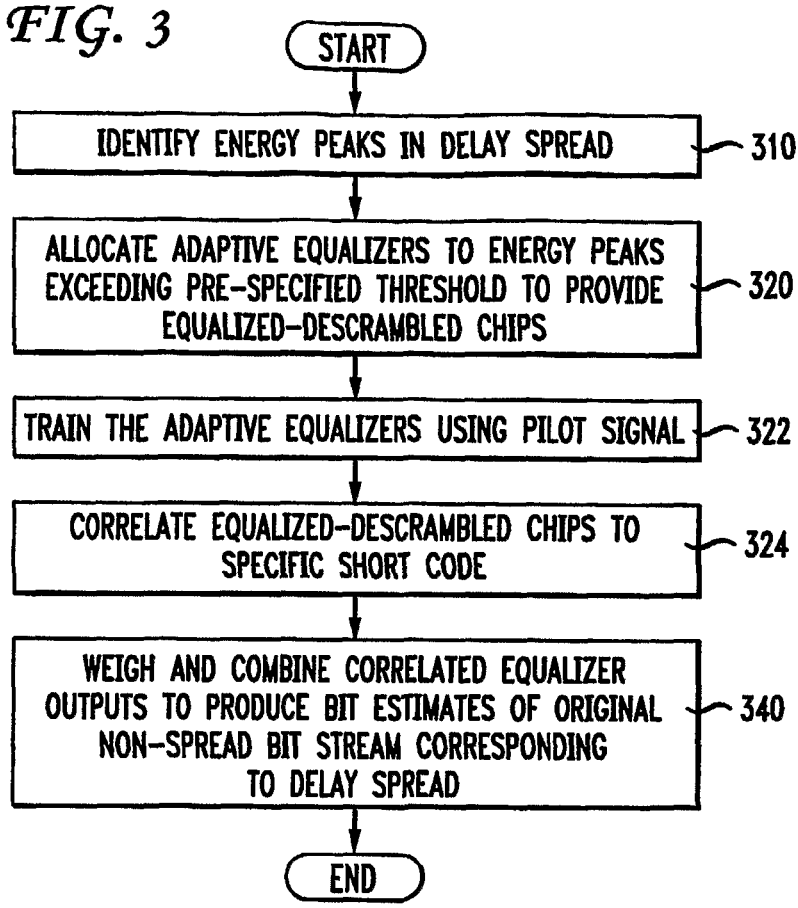
FIG. 3 is a flow diagram illustrating a method for hybrid rake/equalizer processing of a Wideband Code Division Multiple Access (WCDMA) delay spread, according to an illustrative embodiment of the present invention.

FIG. 3 is a flow diagram illustrating a method for hybrid rake/equalizer processing of a Wideband Code Division Multiple Access (WCDMA) delay spread, according to an illustrative embodiment of the present invention. For illustrative purposes, the method of FIG. 3 will be described with respect to the rake/equalizer receiver 100 of FIG. 1. However, it is to be appreciated that the method of FIG. 3 may also be employed with respect to the rake/equalizer receiver 200 of FIG. 2.

Energy peaks in the delay spread are identified by the searcher module 110 (step 310). It is preferable that the searcher module 110 operates continuously in performing such identifications. Typically, the searcher module 110 provides coarse estimates of the amplitude and time of arrival of the strongest multipath components of the mobile station signal.

The adaptive equalizers 130, 140, and 150 are allocated to any of the energy peaks identified by the searcher module 110 that exceed a pre-specified threshold energy level to filter such peaks so as to provide equalized-descrambled chips (step 320).

The adaptive equalizers 130, 140, and 150, are trained by a pilot signal (step 330). That is, the data included in the pilot signal is used to train the adaptive equalizers 130, 140, and 150 with respect to the corresponding transmission channel.

Equalized-descrambled chips output from the adaptive equalizers 130, 140, and 150 are correlated to a specific short code (step 340). That is, the desired bit stream is modulated by a specific short code.

The correlated equalizer outputs are weighted and combined by the correlate, weight and sum module 160 to produce bit estimates of an original non-spread bit stream corresponding to the delay spread (step 350). The weights are proportional to the amount of energy in the corresponding delay spread region.

A description will now be given with respect to FIGS. 4-6 of simulations performed in accordance with an illustrative embodiment of the present invention. The simulations were performed with a WCDMA system having a spreading factor of 32 and 7 active users. A pilot signal was also transmitted with power equal to that allocated to a single user. The velocity of the mobile is 120 km/hr and each tap of the channel is Rayleigh faded. The receiver filters the chip waveform with a root-raised cosine filter prior to equalization The equalizers were implemented in accordance with those shown in FIG. 2 herein. It is to be appreciated that it is possible to remove the filter and let the fractionally spaced equalizer perform the task of filtering.

Figure 4:
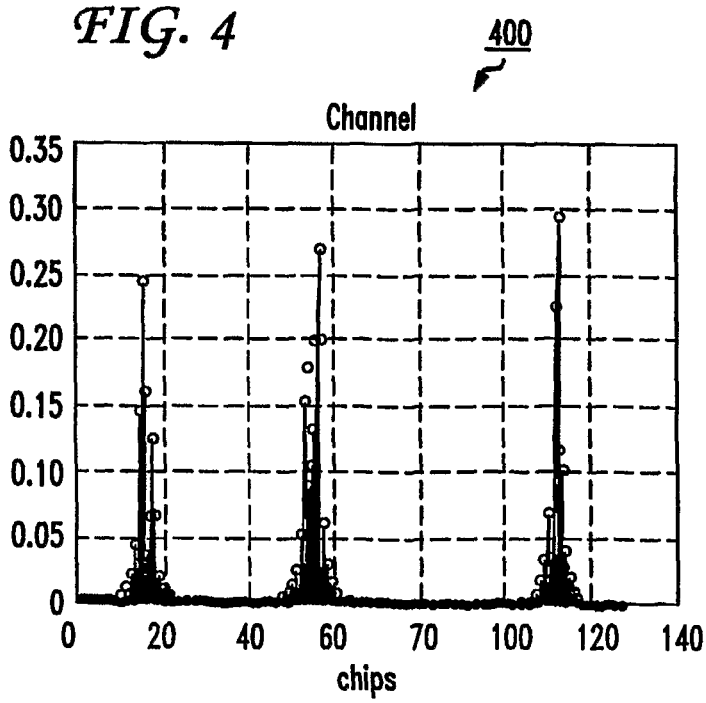
FIG. 4 is a plot 400 illustrating a channel realization corresponding to a simulation of the present invention.

FIG. 4 is a plot 400 illustrating a channel realization corresponding to the simulation of the present invention. That is, FIG. 4 is a magnitude plot of ½-chip spaced channel coefficients versus delay (in chips) for a WCDMA channel implemented in accordance with the present invention.

Figure 5:
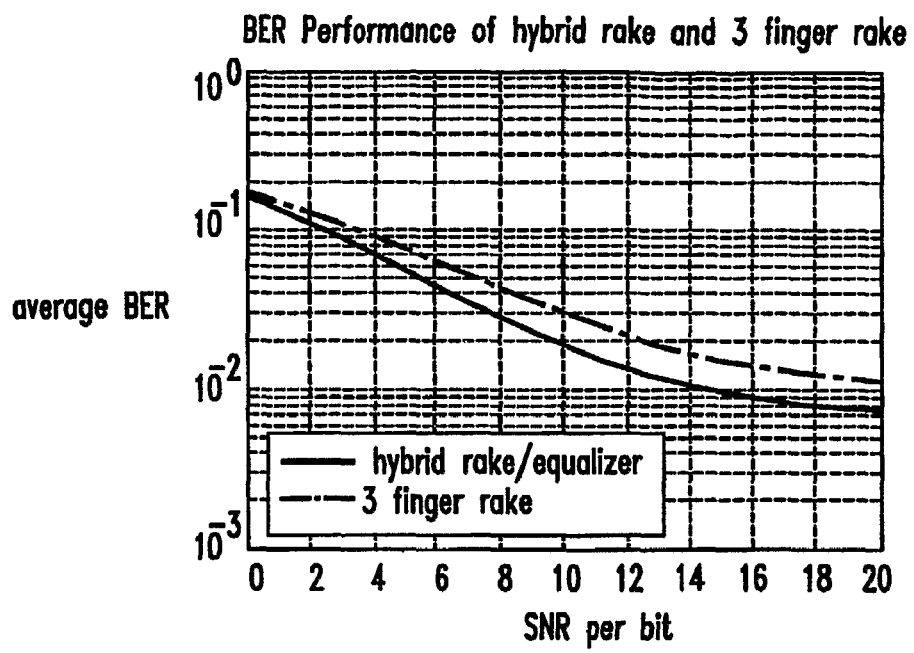
FIG. 5 is a plot 500 illustrating the Bit Error Rate (BER) performance of a hybrid rake/equalizer corresponding to the simulation of the present invention and of a 3-finger rake receiver according to the prior art.

FIG. 5 is a plot 500 illustrating the Bit Error Rate (BER) performance of a hybrid rake/equalizer corresponding to the simulation of the present invention and of a 3-finger rake receiver according to the prior art. That is, FIG. 5 is a plot of the average BER versus the Signal-to-Noise Ratio (SNR) per bit for a hybrid rake/equalizer corresponding to the simulation of the present invention and to a 3-finger rake receiver according to the prior art. Advantageously, the hybrid rake/equalizer according to the present invention has a lower BER than the 3-finger rake of the prior art.

Figure 6:
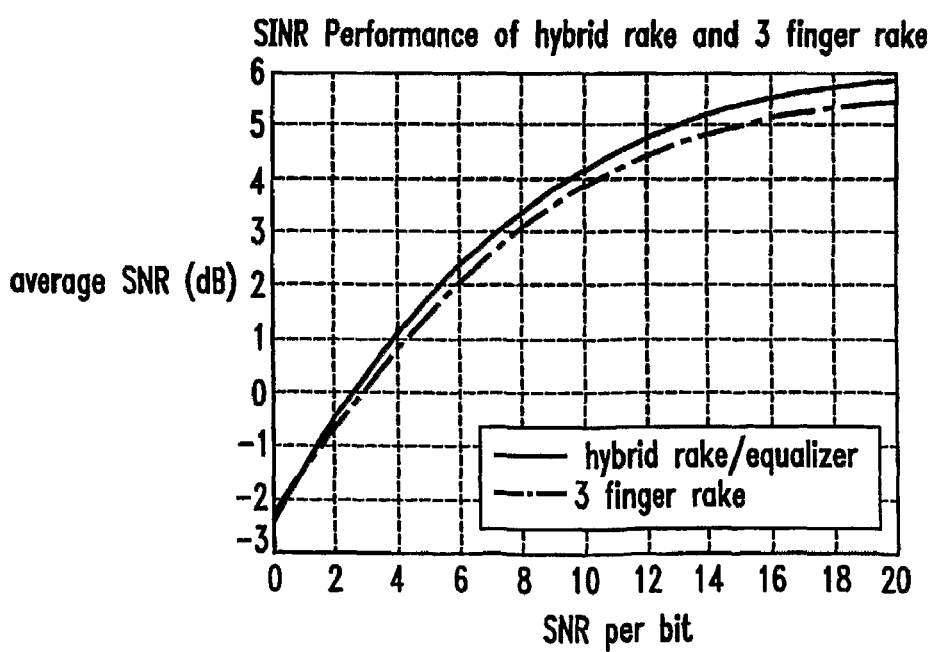
FIG. 6 is a plot 600 illustrating the Signal to Interference-plus-(Noise Ratio of a hybrid rake/equalizer corresponding to the simulation of the present invention and of a 3-finger rake receiver according to the prior art.

FIG. 6 is a plot 600 illustrating the Signal to Interference-plus-Noise Ratio of a hybrid rake/equalizer corresponding to the simulation of the present invention and of a 3-finger rake receiver according to the prior art. That is, FIG. 6 is a plot of the average Signal to Interference-plus-Noise Ratio versus the Signal-to-Noise Ratio (SNR) per bit for a hybrid rake/equalizer corresponding to the simulation of the present invention and to a 3-finger rake receiver according to the prior art. Advantageously, the hybrid rake/equalizer according to the present invention has a higher Signal to Interference-plus-Noise Ratio than the 3-finger rake of the prior art.

For further details relating to WCDMA, see, e.g., WCDMA for UMTS, Radio Access for Third Generation Mobile Communications, John Wiley & Sons, Ltd., pubs., Harri Holma and Antti Toskala, eds., 2001, incorporated by reference herein in its entirety.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

The invention claimed is:

1. A hybrid rake/equalizer receiver for correlating a delay spread in a spread spectrum system, comprising:
    a plurality of adaptive equalizers, each for filtering different regions of the delay spread that have an energy level above a threshold to respectively provide equalized-descrambled chip sequences for correlation, wherein equalizer coefficients respectively corresponding to the plurality of adaptive equalizers are updated individually; and
    a correlation module for correlating the equalized-descrambled chip sequences to a short spreading code to provide correlated outputs, for weighting the correlated outputs to produce weighted-correlated outputs, and for summing the weighted-correlated outputs to produce a bit estimate of an original non-spread bit stream corresponding to the delay spread;
    wherein the correlation module weights the correlated outputs according to how much energy is respectively present in the different regions of the delay spread such that the different regions having low energy are given a lower weight than the different regions having high energy.

2. The hybrid rake/equalizer receiver of claim 1, wherein the correlation module performs trivial weighting on the correlated outputs.

3. The hybrid rake/equalizer receiver of claim 1, wherein the spread spectrum system is a Wideband Code Division Multiple Access (WCDMA) system.

4. In a spread spectrum receiver, a method for correlating a delay spread, comprising the steps of:
    respectively allocating each of a plurality of adaptive equalizers to different regions in the delay spread that exceed a threshold energy level to filter the different regions so as to provide equalized-descrambled chip sequences there from; and individually updating equalizer coefficients respectively corresponding to the plurality of adaptive equalizers;
    correlating the equalized-descrambled chip sequences to a short spreading code to provide correlated outputs;
    as signing weights to the correlated outputs to produce weighted-correlated outputs, said assigning step further assigning the weights to the correlated outputs according to how much energy is present in corresponding portions of the delay spread such that the corresponding portions having low energy are given a lower weight than the corresponding portions having high energy; and
    summing the weighted-correlated outputs to produce a bit estimate of an original non-spread bit stream corresponding to the delay spread.

5. The method of claim 4, wherein said assigning step further assigns trivial weights to the correlated outputs.

6. The method of claim 4, wherein the spread spectrum receiver is a Wideband Code Division Multiple Access (WCDMA) receiver.

7. The hybrid rake/equalizer receiver of claim 1, wherein said threshold is specified by a user of the hybrid rake/equalizer receiver prior to operation of the same.

8. The method of claim 4, wherein said threshold is specified by a user of the hybrid rake/equalizer receiver prior to operation of the same.

* * * * *